(12) United States Patent
Maguin et al.

(10) Patent No.: US 9,103,260 B2
(45) Date of Patent: Aug. 11, 2015

(54) DEVICE FOR SUPPLYING LIQUID REDUCING AGENT AND MOTOR VEHICLE HAVING THE DEVICE

(71) Applicant: EMITEC GESELLSCHAFT FUER EMISSIONSTECHNOLOGIE MBH, Lohmar (DE)

(72) Inventors: Georges Maguin, Marly (FR); Jan Hodgson, Troisdorf (DE); Sven Schepers, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 14/173,222

(22) Filed: Feb. 5, 2014

(65) Prior Publication Data

US 2014/0150412 A1   Jun. 5, 2014

Related U.S. Application Data

(63) Continuation of application No. PCT/EP2012/065273, filed on Aug. 3, 2012.

(30) Foreign Application Priority Data

Aug. 5, 2011   (EP) ..................................... 11290363

(51) Int. Cl.
*F01N 3/00* (2006.01)
*F01N 3/20* (2006.01)

(52) U.S. Cl.
CPC .............. *F01N 3/206* (2013.01); *F01N 3/2066* (2013.01); *F01N 2610/02* (2013.01); *F01N 2610/14* (2013.01); *F01N 2610/1406* (2013.01); *F01N 2610/1466* (2013.01); *Y02T 10/24* (2013.01)

(58) Field of Classification Search
CPC ..... F01N 3/2066; F01N 3/206; F01N 261/02; F01N 2610/14; F01N 2610/1466
USPC ............................................ 60/295, 286, 301
See application file for complete search history.

(56) References Cited

U.S. PATENT DOCUMENTS 8,240,277 B1 *   8/2012   Michikawauchi et al. ... 123/1 A
2006/0196560 A1   9/2006   Nygren
(Continued)

FOREIGN PATENT DOCUMENTS

DE   102009029400 A1   3/2011
KR   1019990004997 A   1/1999
WO   2011085830 A1   7/2011

OTHER PUBLICATIONS

English translation of German Patent Application Publication No. DE 102009029400 A1 (Mar. 24, 2011).*

(Continued)

*Primary Examiner* — Jason Shanske
(74) *Attorney, Agent, or Firm* — Laurence A. Greenberg; Werner H. Sterner; Ralph E. Locher

(57) ABSTRACT

A device for supplying liquid reducing agent for an exhaust gas treatment device, includes at least a tank with an interior in which reducing agent can be stored, an intake in the interior, a delivery device situated in a separate chamber in a tank bottom of the tank, a line leading from the delivery device to the exhaust gas treatment device and passing through the tank bottom at the separate chamber, and a cleaning layer covering the intake. An intermediate space is formed between the intake and the cleaning layer and contains at least one sponge element which can absorb reducing agent and from which the delivery device can extract reducing agent through the intake. A motor vehicle having the device is also provided.

16 Claims, 2 Drawing Sheets

(56) References Cited

U.S. PATENT DOCUMENTS

| | | | |
|---|---|---|---|
| 2009/0031713 A1* | 2/2009 | Suzuki | 60/301 |
| 2009/0288396 A1* | 11/2009 | Sakata et al. | 60/286 |
| 2010/0031639 A1* | 2/2010 | Kwon | 60/286 |
| 2010/0050606 A1* | 3/2010 | Fulks et al. | 60/286 |
| 2012/0311999 A1 | 12/2012 | Hodgson et al. | |

OTHER PUBLICATIONS

International Search Report of PCT/EP2012/065273, Dated Nov. 30, 2012.

* cited by examiner

DEVICE FOR SUPPLYING LIQUID REDUCING AGENT AND MOTOR VEHICLE HAVING THE DEVICE

CROSS-REFERENCE TO RELATED APPLICATION

This is a continuation, under 35 U.S.C. §120, of copending International Application No. PCT/EP2012/065273, filed Aug. 3, 2012, which designated the United States; this application also claims the priority, under 35 U.S.C. §119, of European Patent Application EP 11 290 363.8, filed Aug. 5, 2011; the prior applications are herewith incorporated by reference in their entirety.

BACKGROUND OF THE INVENTION

Field of the Invention

The invention relates to a device for supplying at least partially liquid reducing agent and a motor vehicle having the device. Recently, the automotive sector has seen increasing use of exhaust gas treatment devices in which a liquid and/or partially vaporized reducing agent is used to clean the exhaust gases from an internal combustion engine.

An exhaust gas cleaning method which is carried out particularly often in such exhaust gas treatment devices is that of selective catalytic reduction (SCR), in which nitrogen oxide compounds in the exhaust gas are reduced by using the reducing agent. As a rule, ammonia is used as the reducing agent. Ammonia is normally not stored in the pure form in motor vehicles but in the form of a reducing agent precursor solution, which can be converted into ammonia in the exhaust gas or in an additional reactor situated outside the exhaust gas and/or in the exhaust gas. A reducing agent precursor solution that is used particularly often is aqueous urea solution, which can be obtained, for example, under the trademark AdBlue®, which has a urea content of 32.5%. The terms "reducing agent" and "reducing agent precursor solution" are used synonymously below.

One problem with reducing agent is that it can freeze at low temperatures. The reducing agent AdBlue® freezes at −11° C., for example. Such low temperatures can occur during the operation of a motor vehicle, e.g. during long stationary phases. Another problem is that the reducing agent represents a service fluid in additional to the fuel in the motor vehicle and has to be replenished by the user of the motor vehicle. That entails an additional effort during the operation of the motor vehicle. It is therefore desirable that as large as possible a volume of reducing agent can be stored in such a tank. At the same time, a reducing agent tank with a delivery device represents additional weight in a motor vehicle. In order to minimize that additional weight, it should in turn be possible to deliver as much as possible of the reducing agent stored in a reducing agent tank, leaving as little as possible in the tank. It should also be taken into account that the motor vehicle itself is in motion during operation and that new conditions are continuously arising for the tank and/or the delivery device, e.g. a sloping position of the tank and/or of the delivery unit, sloshing movements of the reducing agent, etc. Even under those changing conditions, operation should be as precise as possible. Moreover, it should be possible to produce a device for supplying liquid reducing agent as economically as possible, and it should be simple to maintain in service. Another factor that should be taken into account is that the reducing agent coming from the tank should be cleaned, and the cleaning process should likewise be adapted to delivery in variable operating conditions.

SUMMARY OF THE INVENTION

It is accordingly an object of the invention to provide a device for supplying liquid reducing agent and a motor vehicle having the device, which overcome, solve or at least mitigate the hereinafore-mentioned disadvantages of the heretofore-known devices and vehicles of this general type. In particular, the intention is to disclose a particularly inexpensive device for supplying reducing agent, in which the reducing agent, which is present in a tank, can be used as completely as possible.

With the foregoing and other objects in view there is provided, in accordance with the invention, a device for supplying liquid reducing agent for an exhaust gas treatment device. The device comprises at least:

a tank with an interior, in which reducing agent can be stored, an intake in the interior, a delivery device, which is situated in a separate chamber in the tank bottom of the tank, a line from the delivery device to the exhaust gas treatment device, the line passing through the tank bottom at the separate chamber, a cleaning layer, which covers the intake, and an intermediate space formed between the intake and the cleaning layer, in which at least one sponge element is provided that can absorb reducing agent and from which the delivery device can extract reducing agent through the intake.

As a rule, the tank has a (continuous) tank wall which surrounds the interior. The intake can, in particular, be an opening in the tank wall, to which a line leading to the delivery device is connected. The delivery device typically has functional components which perform and/or control delivery of the reducing agent. A functional component, in particular, is a pump which draws in reducing agent from the intake through the line mentioned. The following functional components can furthermore be provided, in particular: at least one pressure sensor which can be used to determine a pressure of the reducing agent in the delivery device, at least one temperature sensor which can be used to determine the temperature of the reducing agent, and/or at least one valve which can be used to control the flow or delivery of reducing agent through the delivery device.

The delivery device in turn is preferably connected by another line to an (external) injector, which adjoins the exhaust gas treatment device and through which the reducing agent delivered by the delivery device can be fed to the exhaust gas treatment device. Instead of an injector, it is also possible to provide an injection device or spraying device, which is not itself actively controllable but opens automatically at a predetermined reducing agent pressure built up by the delivery device. The line preferably extends through the tank bottom in the region of the separate chamber. The reducing agent is thus extracted from the tank through the tank bottom. The only opening in or passage through the tank wall, with the possible exception of a tank filler neck, is preferably that in the tank bottom, through which reducing agent is delivered.

The cleaning layer is preferably a (single or multiple) ply which retains impurities in the reducing agent in an effective manner, ensuring that they remain in the interior of the tank and do not enter the sponge element and/or the delivery device. The sponge element thus contains cleaned reducing agent. The cleaning layer has a sheet-like construction. The cleaning layer preferably has an area of at least 50 cm² [square centimeters], particularly preferably more than 100 cm². The area is preferably not greater than 500 cm². The cleaning layer can also be corrugated in order to obtain a particularly large area. The cleaning layer preferably has a thickness of less than 2 mm [millimeters], preferably less than 1 mm. The cleaning layer is preferably at least 100 μm [micrometers] thick.

The at least one sponge element is, in particular, a porous structure with open pores, into which the reducing agent can penetrate. The sponge element can be formed by an open-cell foam, for example. The sponge element is preferably flexible and deformable. The sponge element is preferably disposed at a particularly small distance from the intake to enable the delivery device to extract reducing agent from the sponge element. The distance between the intake and the sponge element is preferably less than 2 cm [centimeters] and, in particular, less than 1 cm—and, in particular, the opening of the intake directly and immediately adjoins a sponge element (e.g. with mutual contact). In this case, the term "distance" means the shortest distance between the intake and the sponge element in the assembled position.

The device is advantageous particularly if the sponge element (or all of the sponge elements together) fill at least 75% and preferably at least 85% of the intermediate space. In particular, this expresses as it were the degree to which the sponge element impregnated with reducing agent fills the intermediate space, i.e. preferably not just the filling of the intermediate space by the material of the sponge element or by the walls of the sponge element alone. The (empty and full) pore volume of the sponge element is included in this case.

Fundamentally, there is a preference for the provision of just one sponge element. If the intention is to use a plurality of sponge elements, they should all have the same properties, shape, etc. (especially if there is just an intake). This has no bearing on the possibility of using different types, sizes, shapes, etc. of sponge element in general.

In accordance with another advantageous feature of the device of the invention, the sponge element forms a plurality (in particular a multiplicity) of channels from the cleaning layer to the intake. These channels are preferably in the form of capillaries. The channels preferably have a mean diameter of less than 500 μm [micrometers].

The device is particularly advantageous if the intake is covered by at least one filter and/or screen and the sponge element is situated in an intermediate space between the filter/screen and the intake. The reducing agent in the tank often contains impurities, which should if at all possible not get into the delivery device so as to avoid damaging the functional components of the delivery device. Through the use of a filter and/or a screen in front of the intake, it is possible to prevent these impurities entering the delivery device. If the sponge element is disposed between the intake and the filter or screen, then the reducing agent stored in the sponge element has already been cleaned. Moreover, the filter or screen frames the sponge element and thus defines the position of the sponge element in the interior of the tank. The external surface of the sponge element can also be secured on a wall of the tank and/or on the filter or screen.

In accordance with an added advantageous feature of the device of the invention, the sponge element is constructed in such a way that it draws in reducing agent. The sponge element preferably draws in reducing agent from the interior of the tank through the cleaning layer by capillary forces. The capillary forces of the sponge element result from the material of the sponge element, from the size of the individual pores/channels in the sponge element and from the properties of the reducing agent. The relevant properties of the reducing agent in this case are, in particular, the surface tension and viscosity. The sponge element is preferably constructed in such a way that it can draw in liquid reducing agent up to a pressure difference of more than 0.05 bar, preferably more than 0.1 bar, or up to a height of more than 50 cm [centimeters], preferably more than 100 cm, by capillary force.

There is typically a resistance to flow from the interior into the intermediate space through the cleaning layer. The suction effect of the sponge element is preferably provided in such a way that it at least partially compensates for the resistance to flow of the cleaning layer in normal operation at normal delivery rates (1 liter per hour to 10 liters per hour). The sponge element draws the reducing agent through the cleaning layer.

In accordance with an additional advantageous feature of the device of the invention, the sponge element covers the intake. The sponge element is preferably disposed in front of the intake in the intermediate space in such a way that a flow path from any point in the interior of the tank to the intake must pass through the sponge element. This ensures that whenever almost all of the reducing agent has already been delivered from the interior of the tank or the tank is almost empty, the remaining residual quantity of reducing agent is present/stored in the sponge element and can continue to be extracted by the delivery device through the intake.

In accordance with yet another advantageous feature of the device of the invention, the separate chamber extends at least partially into the interior from the tank bottom, with the intake being situated at the tank bottom. By way of example, the chamber can be embodied as an inwardly-curved portion in the tank bottom extending into the interior of the tank. It is also possible to provide an opening in the tank bottom, into which the separate chamber is inserted. This inwardly-curved portion can be closed off from the outside by using a cover. The tank or tank wall and the tank bottom are preferably manufactured from plastic. The separate chamber can likewise be manufactured from plastic or have a wall made of plastic. However, it is also possible for the separate chamber to be manufactured from metal. The separate chamber preferably has a heater, which can be used to melt the reducing agent in the delivery device and in the interior close to the chamber if it is in the frozen state. The heater is preferably constructed in such a way that reducing agent, particularly that in the sponge element, can be melted (first).

In accordance with yet a further advantageous feature of the device of the invention, the cleaning layer has at least one filter or screen. A screen or a filter is an effective way of achieving the cleaning effect of the cleaning layer. It is also possible for a filter and a screen to be combined in the cleaning layer. It is very particularly preferred that this cleaning layer should form the single filter or the single screen of the device, which develops a cleaning effect in operation. The cleaning layer thus separates a "clean side" from a "dirty side" of the reducing agent flow.

Preference is also given to a device in which the cleaning layer surrounds the separate chamber over the full circumference in the circumferential direction.

In accordance with yet an added advantageous feature of the device of the invention, the cleaning layer and the sponge element surround the separate chamber over the full circumference in the circumferential direction.

Thus, it is possible to achieve a cleaning layer with a very large area, through which the reducing agent can flow with a low resistance to flow. In the embodiment with the sponge element between the cleaning layer (in particular filter or screen), the latter being disposed around the full circumference, and the separate chamber, reducing agent is, as a rule, moved onto the surface of the cleaning layer during sloshing movements of the reducing agent in the tank and thus passes through the cleaning layer into the sponge element. In this way, it is possible to ensure that all of the reducing agent in the interior of the tank passes into the sponge element and that there is thus still reducing agent in the immediate vicinity of the intake when almost all of the reducing agent has been delivered from the interior of the tank by the delivery device.

In this case, the term "surrounded over the full circumference" means, in particular, that the sponge element and the cleaning layer form at least a ring around the separate chamber. The sponge element and the cleaning layer preferably even form a kind of cylinder around the separate chamber. A cylindrical cleaning layer preferably has a diameter of between 100 mm [millimeters] and 150 mm and a height of between 30 mm and 80 mm. Of course, this can apply, changing only those things which need to be changed, to modified basic shapes of the chamber, with a substantially constant radial spacing preferably being maintained.

In accordance with yet an additional advantageous feature of the device of the invention, the intake has a plurality of intake openings, and the sponge element spans all of the intake openings.

Due to the capillary forces, the reducing agent is, as a rule, held relatively securely in the sponge element. For removal of the reducing agent from the sponge element, the intake opening should, as a rule, be disposed in a location relatively close to the position of the sponge element in which the reducing agent to be extracted is actually present. It is often difficult to draw reducing agent to the intake opening across long distances within the sponge element. For this reason, it is advantageous to place a plurality of intakes in/at the sponge element. The reducing agent drawn in by the sponge element is, as a rule, uniformly distributed in the sponge element. The capillary forces can distribute the reducing agent present in the sponge element uniformly in the sponge element. For this reason, there is typically an equal quantity of reducing agent at a plurality of intake openings covered by the sponge element, even if the quantity of reducing agent stored in the sponge element has already been greatly reduced.

With the objects of the invention in view, there is concomitantly provided a motor vehicle, comprising an internal combustion engine, an exhaust gas treatment device for cleaning the exhaust gases from the internal combustion engine and a device according to the invention for supplying reducing agent for an exhaust gas treatment device. The device for supplying reducing agent feeds the reducing agent to the exhaust gas treatment device by using at least one injector, at least one injection device or at least one spraying device.

Other features which are considered as characteristic for the invention are set forth in the appended claims, noting that the features presented individually in the claims can be combined in any technologically meaningful way and can be supplemented by explanatory material from the description, giving rise to additional variant embodiments of the invention.

Although the invention is illustrated and described herein as embodied in a device for supplying liquid reducing agent and a motor vehicle having the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
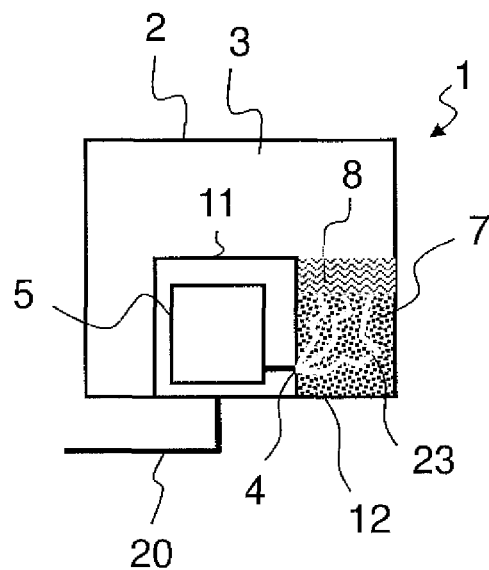
FIG. 1 is a diagrammatic, vertical-sectional view of a first variant embodiment of a device for supplying reducing agent.

Referring now in detail to the figures of the drawing for explaining the invention and the technical field in more detail by showing particularly preferred structural variants to which the invention is not restricted and in which the figures and especially the proportions are only diagrammatically shown, and first, particularly, to FIG. 1 thereof, there is seen a variant of a device 1 which has a particularly simple construction. The device 1 includes a tank 2 with an interior 3 and a delivery device 5, which is disposed in a separate chamber 11 in a tank bottom 12 of the tank 2. The delivery device 5 is connected to the interior 3 of the tank 2 by an intake 4. The delivery device 5 has a pump 19, which draws in reducing agent at the intake 4 and can deliver it through a line 20 to a non-illustrated injector or to a non-illustrated spraying device at an exhaust gas treatment device. The line 20 passes through the tank bottom 12 in the region of the separate chamber 11. A sponge element 7, which is shielded from the interior 3 by a cleaning layer 8, is provided in the interior 3 of the tank 2 in the immediate vicinity of the intake 4. The sponge element 7 can absorb reducing agent, and the delivery device 5 can extract reducing agent from the sponge element 7 through the intake 4. The sponge element 7 forms channels 23 from the cleaning layer 8 to the intake 4.

Figure 2:
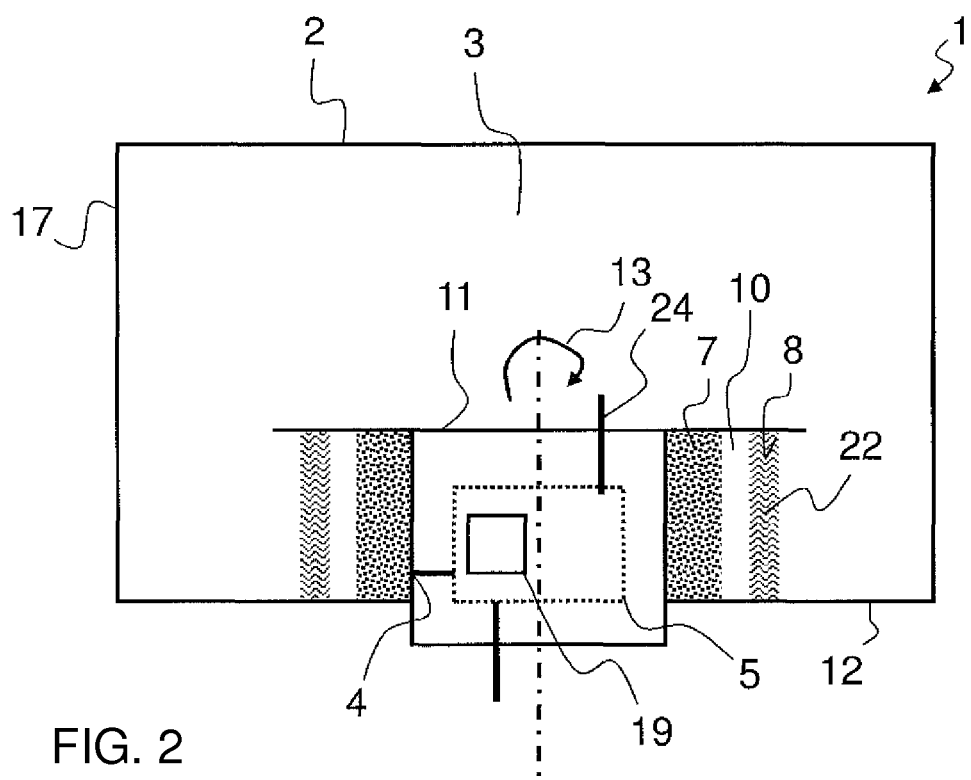
FIG. 2 is an enlarged, vertical-sectional view of a second variant embodiment of a device for supplying reducing agent.
Figure 3:
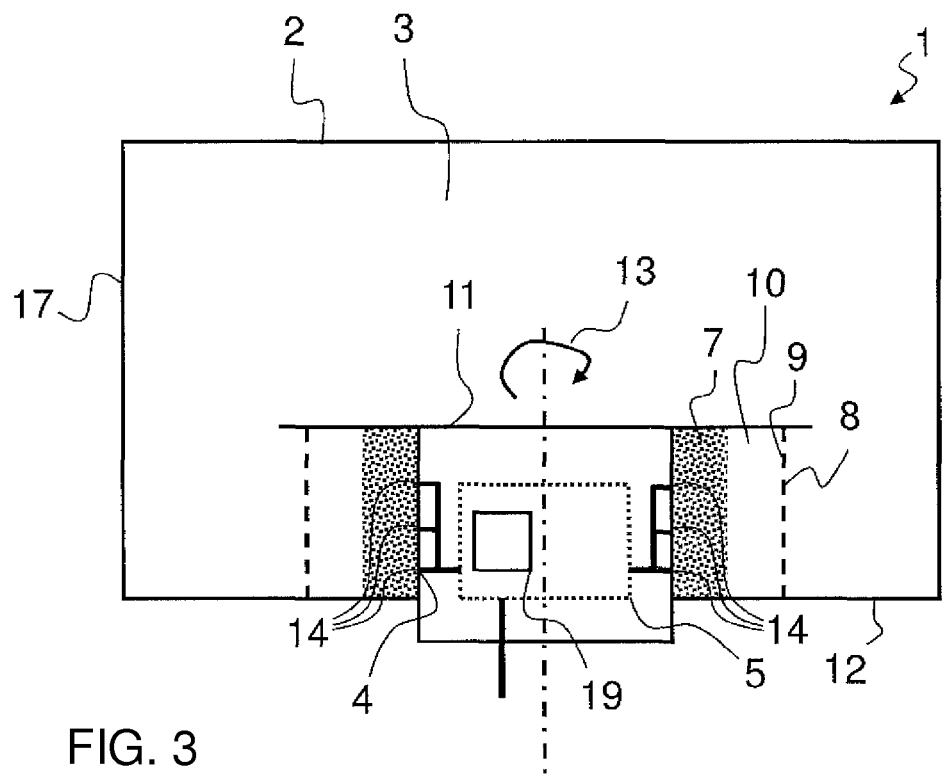
FIG. 3 is a vertical-sectional view of a third variant embodiment of a device for supplying reducing agent.

FIGS. 2 and 3 each show variant embodiments of the device 1 that are more complex than that in FIG. 1. In both figures, the device 1 has a tank 2 with an interior 3. The tank 2 has a tank wall 17 which forms the tank bottom 12 in a lower area. Inserted into the tank bottom 12 is a chamber 11, in which the delivery device 5 is situated. The chamber 11 extends from the tank bottom 12 into the interior 3. By way of example, the chamber 11 can have a rotationally symmetrical construction. According to FIG. 2, a filter 22 is formed in a circumferential direction 13 around the chamber 11 as a cleaning layer 8. According to FIG. 3, a screen 9 is disposed around the chamber 11 in the circumferential direction 13 as a cleaning layer 8. The filter 22 or the screen 9 surrounds the chamber over the full circumference. That is to say that the filter 22 or screen 9 encompasses the full 360° of the circumference of the chamber 11. An intermediate space 10 is disposed between the chamber 11 or the intake 4 formed on the chamber 11 and the filter 22 or screen 9. The sponge element 7 is situated in the intermediate space 10. The sponge element 7 fills the intermediate space 10 as completely as possible. Each of the delivery devices 5 shown in FIGS. 2 and 3 also has a pump 19. A return 24 back into the tank 2 can furthermore be provided on the high-pressure side downstream of the pump 19 to enable the line to be emptied and/or bled (in the case of shut-off and/or freezing), for example.

According to the special variant embodiment in FIG. 3, the intake 4 has a plurality of intake openings 14, which are preferably disposed in a uniformly distributed manner on the sponge element 7 in such a way that any point of the sponge element 7 is at a distance of preferably less than 2 cm [centimeters], particularly preferably less than 1 cm, from an intake opening 14. The concept of providing a plurality of intake openings 14 for the intake 4 can also be employed independently of the other features illustrated in FIG. 3 while remaining within the scope of the invention.

Figure 4:
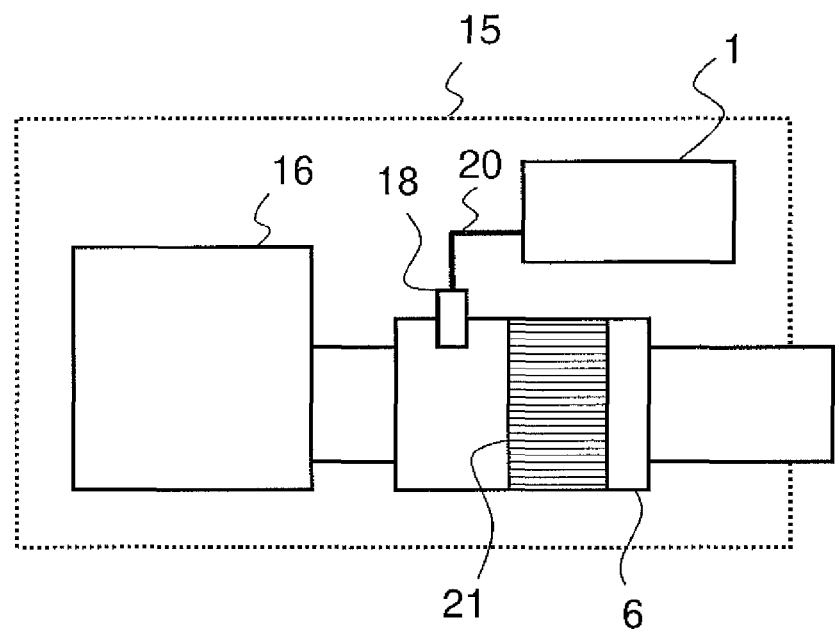
FIG. 4 is a schematic and block diagram of a motor vehicle having a device for supplying reducing agent.

FIG. 4 shows a motor vehicle 15 having an internal combustion engine 16 and an exhaust gas treatment device 6 for cleaning the exhaust gases of the internal combustion engine 16. The exhaust gas treatment device 6 contains an SCR catalytic converter 21, in which the method of selective catalytic reduction can be carried out. For this purpose, a reducing agent can be fed to the exhaust gas treatment device 6 by using an injector 18. The injector 18 receives the reducing agent from a device 1 which is connected to the injector 18 by a line 20. In one variant embodiment of the invention, the injector 18 can also be an injection nozzle or some other injection device.

The invention claimed is:

1. A device for supplying liquid reducing agent for an exhaust gas treatment device, the device comprising:
   a tank having a tank bottom and an interior configured to store reducing agent;
   a separate chamber disposed in said tank bottom;
   a delivery device disposed in said separate chamber for delivering reducing agent;
   a line configured to lead from said delivery device to the exhaust gas treatment device, said line passing through said tank bottom at said separate chamber;
   an intake fluidly connecting said delivery device to said interior of said tank and having an intake opening;
   a cleaning layer covering said intake;
   said intake and said cleaning layer forming an intermediate space therebetween;
   at least one sponge disposed in said intermediate space, said at least one sponge configured to draw-in reducing agent from said interior of said tank through said cleaning layer by capillary forces, configured to absorb reducing agent and configured to provide reducing agent to be extracted by said delivery device through said intake; and
   said intake opening directly contacting said sponge.

2. The device according to claim 1, wherein said sponge forms a plurality of channels from said cleaning layer to said intake.

3. The device according to claim 1, wherein said sponge covers said intake.

4. The device according to claim 1, wherein said separate chamber extends from said tank bottom at least partially into said interior, and said intake is disposed at said tank bottom.

5. The device according to claim 1, wherein said cleaning layer has at least one filter or at least one screen.

6. The device according to claim 1, wherein said separate chamber has an outer circumference and a circumferential direction, and said cleaning layer and said sponge surround said separate chamber over said outer circumference in said circumferential direction.

7. The device according to claim 1, wherein said intake has a plurality of intake openings, and said sponge spans all of said intake openings.

8. The device according to claim 1, wherein said separate chamber has a heater.

9. The device according to claim 1, wherein said tank has a tank wall, and said intake opening is formed in said tank wall.

10. The device according to claim 1, wherein said separate chamber has a separate chamber wall, and said intake opening is formed in said separate chamber wall.

11. The device according to claim 1, wherein said sponge is disposed in front of said intake opening and spans said intake opening.

12. The device according to claim 1, wherein said cleaning layer shields said sponge.

13. The device according to claim 1, wherein said sponge is a porous structure with open pores, into which said reducing agent can penetrate.

14. The device according to claim 1, wherein said sponge is formed of an open-cell foam.

15. The device according to claim 1, wherein said line passes downward through said tank bottom at said separate chamber.

16. A motor vehicle, comprising:
   an internal combustion engine;
   an exhaust gas treatment device configured to clean exhaust gases from said internal combustion engine; and
   the device according to claim 1 configured to feed reducing agent into said exhaust gas treatment device.

* * * * *